US012596081B2

(12) United States Patent
Zeinolabedinzadeh et al.

(10) Patent No.: US 12,596,081 B2
(45) Date of Patent: Apr. 7, 2026

(54) COMPACT, LOW-POWER, HIGH IMAGE REJECTION SIDEBAND SEPARATION RECEIVER

(71) Applicants: ARIZONA BOARD OF REGENTS ON BEHALF OF ARIZONA STATE UNIVERSITY, Scottsdale, AZ (US); CALIFORNIA INSTITUTE OF TECHNOLOGY, Pasadena, CA (US)

(72) Inventors: Saeed Zeinolabedinzadeh, Chandler, AZ (US); Ebrahim Al Seragi, Mesa, AZ (US); Paul Goldsmith, Topanga, CA (US)

(73) Assignees: ARIZONA BOARD OF REGENTS ON BEHALFOF ARIZONA STATE UNIVERSITY, Scottsdale, AZ (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 482 days.

(21) Appl. No.: 18/059,932

(22) Filed: Nov. 29, 2022

(65) Prior Publication Data

US 2023/0168211 A1 Jun. 1, 2023
US 2023/0304945 A2 Sep. 28, 2023

Related U.S. Application Data

(60) Provisional application No. 63/284,380, filed on Nov. 30, 2021.

(51) Int. Cl.
*G01N 22/00* (2006.01)

(52) U.S. Cl.
CPC .................................... *G01N 22/00* (2013.01)

(58) Field of Classification Search
CPC .......... G01N 22/00; H03D 1/24; H03D 7/161; H03D 7/165; H03D 7/18; H03D 3/26; G01S 7/354; G01S 7/35; G01S 19/37; G01S 19/36; H04B 1/0096; H04B 1/0075; H04B 1/0483; H04B 1/16; H04B 1/30; H04B 1/06; H04B 1/40; H04B 1/26; H04B 2001/0491; H04B 15/06; H04B 2001/1072; H04B 7/08; H04B 1/04; H04B 1/007; H04B 10/2507; H04B 1/10; H04B 17/14;

(Continued)

(56) References Cited

U.S. PATENT DOCUMENTS 6,334,051 B1 * 12/2001 Tsurumi ............... H04B 1/0007
375/316
6,529,719 B1 * 3/2003 Imbornone .............. H04B 1/28
455/302

(Continued)

*Primary Examiner* — Lana N Le

(74) *Attorney, Agent, or Firm* — MH2 Technology Law Group, LLP

(57) ABSTRACT

A compact, low-power, high image rejection sideband separation receiver is provided. The receiver observes an input radio frequency (RF) signal of multiple spectral lines (spectral observation), then downconverts the signals to intermediate frequency (IF), and then separates the signals to be observed simultaneously in multiple channels. An embodiment is used to observe a signal (G-band) with two spectral lines and utilizes a two stage Weaver architecture to downconvert the signal's frequency, including a combination of mixers in the second stage that achieves the separation of two different channels.

20 Claims, 16 Drawing Sheets

(58) Field of Classification Search
CPC ........... H04B 1/68; H04B 10/64; H04L 25/03;
H04N 5/455; H04N 11/20
See application file for complete search history.

(56) References Cited

U.S. PATENT DOCUMENTS

| | | | | |
|---|---|---|---|---|
| 2002/0160738 | A1* | 10/2002 | Allott ....................... | H04B 1/30 |
| | | | | 455/302 |
| 2006/0017856 | A1* | 1/2006 | Sheng .................... | H04N 9/646 |
| 2008/0132182 | A1* | 6/2008 | Seo ...................... | H04B 1/0491 |
| | | | | 455/93 |
| 2009/0098848 | A1* | 4/2009 | Ruijter .................... | H04B 1/30 |
| | | | | 455/337 |
| 2011/0215960 | A1* | 9/2011 | Stevens ..................... | G01S 7/36 |
| | | | | 455/226.1 |
| 2017/0134194 | A1* | 5/2017 | Papananos .............. | H04L 27/18 |
| 2018/0267067 | A1* | 9/2018 | Slusher .............. | G01N 33/6848 |
| 2018/0375711 | A1* | 12/2018 | Mao ......................... | H03C 3/40 |
| 2019/0025201 | A1* | 1/2019 | Koulikov ............... | G01N 21/31 |
| 2023/0045810 | A1* | 2/2023 | Yuan ........................ | H04B 1/16 |

* cited by examiner

COMPACT, LOW-POWER, HIGH IMAGE REJECTION SIDEBAND SEPARATION RECEIVER

CROSS REFERENCE TO RELATED APPLICATIONS

This application claims the benefit of U.S. Provisional Patent Application 63/284,380, which was filed on Nov. 30, 2021, and is incorporated herein by reference in its entirety.

GOVERNMENT LICENSE RIGHTS

This invention was made with government support under <80NM0018D0004/1657155> awarded by National Aeronautics and Space Administration. The government has certain rights in the invention.

FIELD

The present disclosure is related to spectroscopic receivers, communication receivers, and sensing.

BACKGROUND

Spectral observation is used to detect the molecular content and isotopic abundance in a compound, and includes a set of spectral lines to identify one element from another. One field application is space observation where observing these lines can provide information about an elemental mass distribution and its relationship to star formation. In this case, the source causing the emission of spectral lines is external to the system. Existing solutions are not suitable for space missions due to size/weight, cost, and power consumption. In another application, health-related sensing devices use spectroscopy for detecting, for example, cholesterol, among other things. Biosensing is gaining ground in cancer diagnosis. In yet another application, the food industry scans specimens for specific content to identify flavor and other taste levels. In this case, the source is provided internally to the system. Some applications require reading multiple spectral lines at the same time to identify the components and abundance. Health-related and biosensing applications use, for example, electrical impedance spectroscopy. Molecular spectroscopy in food testing is currently based on methods including infrared scanning, and is an important part of quality control.

What is needed is a compact, low-power, high image rejection sideband separation receiver that can integrate with, for example, but not limited to, miniaturized satellites and handheld devices, and that can provide dual channel capability.

SUMMARY

A compact, low-power, high image rejection sideband separation receiver is provided. The embodiments described herein provide for implementing sideband separation in receivers using the Weaver image reject architecture, which was developed for low IF receivers to remove the image frequency. This architecture can be used in integrated circuit realization to reduce the size and expense of radio receivers to accommodate, for example, but not limited to, miniaturized satellites and handheld devices. Prior to the development of the Weaver architecture, a bandpass filter was needed to block the image band. The proposed architecture utilizes the Weaver concept to simultaneously receive two separate RF frequencies, down convert, and distinguish the downconverted signal at two separate IF frequencies. The sideband separation architecture of the present teachings includes four mixers, two local oscillator signals, and two low pass filters that together form upper and lower channels. The local oscillators provide quadrature signals to the mixers that are $-\pi/2$ radians out of phase with each other in the upper and lower channels. The first two mixers down-convert both signal and image frequencies to intermediate frequencies (IF), and two other mixers further down convert the signals from first IF to a second lower frequency IF. The summation and subtraction, followed by low pass filtering at the output of the second mixer, separate the image and signal frequencies from each other in the upper and lower channels. In an aspect, one channel contains only the signal with the image frequency suppressed while the other channel only contains the image with the signal frequency suppressed. The receiver is configured to receive two signals, one located at the image frequency of the other resulted from the first low-IF down conversion. A typical implementation consumes<100 mW, not including the power consumed by the local oscillators. The power requirement can be reduced further if all mixers are operating in passive mode. The image rejection ratio (IRR), which is a metric that shows the amount of suppression of undesired signal at each channel, depends on the matching of components in both channels and is less than about $-25$ dB in a typical implementation.

The receiver of the present teachings is suitable for communications, ranging, sensing, and spectroscopy. The receiver observes two input radio frequencies (RF) at the same time, or measures two spectral lines simultaneously (spectral observation), then down converts the signals to an intermediate frequency (IF), and then separates the signals simultaneously in multiple channels. The two paths coming out of the first mixing stage are configured, with the right designed phase combinations, to result in the separation of the two different spectral lines and high image rejection ratio at two separate channels. During the double quadrature down-conversion, a first signal in two channels accumulates the same phase after down-conversion, while a second signal located at the image of the first signal, creates out-of-phase signals at upper and lower channels. The summation of upper and lower channels preserves the first signal and eliminates the second signal, and the subtraction preserves the second signal located at the image frequency of the first signal while eliminating the first signal. The manipulation of the phase and amplitude of each spectral line in the two paths enables separation of the signals so that each path observes one signal and no image (image here is the second signal which was purposefully located at the image frequency of the first signal).

The separation and image rejection of the present teachings make this approach a practical solution for implementing a compact, low cost and low power consumption circuit that can receive two separate frequencies simultaneously without considerably impacting sensitivity of the receiver. The size, weight, power consumption, and cost of the present integrated circuit are an order of magnitude smaller than current sideband separation receivers implemented using discrete components. Size and weight are reduced by using integrated circuit technology versus waveguide components. In terms of performance, the circuit of the present teachings achieves a similar, if not better, sensitivity (NF, Noise Figure) and image rejection ratio (IRR) compared to current circuits. Sensitivity improvement is the result of the use of low noise amplifiers (LNAs), and IRR improvement is the result of phase and amplitude mismatch reduction in the integrated circuit technology. An embodiment is used to observe a signal (G-band) with two spectral lines. Embodiments can be implemented for any frequency band and fabricated with any microelectronics technology.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for sideband separation in signal receivers. The method also includes receiving a RF signal including a plurality of spectral lines, and mixing and down converting the RF signal to first IF signals. The method also includes mixing and down converting the first IF signals into second IF signals, and combining the second IF signals to form a plurality of channels. Other embodiments of this aspect include corresponding computer systems, apparatus, and computer programs recorded on one or more computer storage devices, each configured to perform the actions of the methods.

Implementations may include one or more of the following features. The method as where the first IF signals may include a first IF upper side band formed by mixing the RF signal with a first local oscillator (LO) signal, and it's 90-degrees shifted quadrature, and a first IF lower side band formed by mixing the RF signal with a first LO signal and it's quadrature. The method as may include low pass filtering the first IF signals. The second IF signals may include a second IF upper side band formed by mixing the second IF upper side band with a second local oscillator signal and its quadrature, and a second IF lower side band formed by mixing the second IF lower side band with a second local oscillator signal and its quadrature. To split the LO signals and make the quadrature signals, the second local oscillator signal may include a splitter configured to split the LO signals to several mixers, and at least one balun configured to make balanced signals, the at least one balun configured to balance the phase-shifted of the split signals. The combination performs power splitting and quadrature generation. Without the loss of generality any other type of quadrature generation schemes can be utilized here. The second local oscillator signal may include a polyphase filter configured to take a differential of a signal, the polyphase filter providing four output phased signals (0°), 90°, −90°, 180°. The method may include low pass filtering the second IF signals. Combining the second IF signals may include summing two of the second IF signals forming a first output channel, differencing two of the second IF signals forming a second output channel, and providing the first output channel and the second output channel to a channel receiver. The channel receiver may include additional amplification and analog-to-digital conversion and enables detecting molecular content and isotopic abundance from a spectral observation embodied in the first output channel and the second output channel. Implementations of the described techniques may include hardware, a method or process, or computer software on a computer-accessible medium.

One general aspect includes a circuit for sideband separation in signal receivers. The circuit also includes a first stage configured to receive a RF signal, the first stage configured to produce two first IF signals, a second stage configured to receive the two first IF signals, the second stage configured to produce two second IF signals, and a third stage configured to compute two resulting frequencies based on a sum and a difference between the two second IF signals. Other embodiments of this aspect include corresponding computer systems, apparatus, and computer programs recorded on one or more computer storage devices, each configured to perform the actions of the methods.

Implementations may include one or more of the following features. The circuit as where the first stage may include a first local oscillator (LO1) producing an LO1 signal, a first stage first mixer configured to mix a first phase of the LO1 signal with the RF signal of two sides forming a first mixed signal, a first stage second mixer configured to mix a second phase of the LO1 signal with the RF signal forming a second mixed signal, a first stage first low pass filter (LPF) passes the first two IF upper side band and lower side band in phase signals, and a first stage second LPF passes the first two IF upper side band and lower side band quadrature phase signals The second stage may include a second local oscillator (LO2) producing an LO2 signal, a second stage first mixer configured to mix a first phase of the LO2 signal with the first IF signals forming a second stage first mixed signal, a second stage second mixer configured to mix a second phase of the LO2 signal with the first IF signals forming a second stage second mixed signal, a second stage first LPF passes desired IF signals upper side band and lower side band, and a second stage second LPF passes desired IF signals upper side band and lower side band. The resulting IF signals from second stage first LPF and second stage second LPF are combined to form the upper sided channel and lower side channel. The second local oscillator may include a splitter configured to split the power of the LO signal, and a plurality of baluns configured to receive the split signals, the plurality of baluns configured to provide the split signals to the second stage first mixer and the second stage second mixer. The second local oscillator may include a polyphase filter configured to provide a phasing required to down convert to the second stage second IF signal frequency. Implementations of the described techniques may include hardware, a method or process, or computer software on a computer-accessible medium.

One general aspect includes a method for detecting content of a sample based on emitted spectral lines. The method also includes transmitting a source signal of known frequency, the source signal being received by the sample, the sample emitting a sample signal based on the source signal, and receiving the sample signal including a plurality of spectral lines, mixing and down converting the sample signal to first IF signals. The method also includes mixing and down converting the first IF signals into second IF signals; combining the second IF signals to form a plurality of channels, and detecting the content of the sample based on the plurality of channels. Other embodiments of this aspect include corresponding computer systems, apparatus, and computer programs recorded on one or more computer storage devices, each configured to perform the actions of the methods.

Implementations may include one or more of the following features. The method as where combining the second IF signals may include summing two of the second IF signals forming a first output channel, differencing two of the second IF signals forming a second output channel, and providing the first output channel and the second output channel to a channel receiver. The content may include molecular content and isotopic abundance. A first stage second mixer configured to mix a second phase of the LO1 signal with the RF signal forming a second mixed signal, a first stage first low pass filter (LPF) passes the first two IF upper side band and lower side band in phase signals, and a first stage second LPF passes the first two IF upper side band and lower side band quadrature phase signals The second stage may include a second local oscillator (LO2) producing an LO2 signal, a second stage first mixer configured to mix a first phase of the LO2 signal with the first IF signals forming a second stage first mixed signal, a second stage second mixer configured to mix a second phase of the LO2 signal with the first IF signals forming a second stage second mixed signal, a second stage first LPF passes desired IF signals upper side band and lower side band, and a second stage second LPF passes desired IF signals upper side band and lower side band. The resulting IF signals from second stage first LPF and second stage second LPF are combined to form the upper sided channel and lower side channel. The second local oscillator signal may include a polyphase filter configured to take a differential of a signal, the polyphase filter providing four output phased signals. Implementations of the described techniques may include hardware, a method or process, or computer software on a computer-accessible medium.

One general aspect includes a system for detecting content of a sample based on emitted spectral lines. The system also includes a transmitter configured to transmit a source signal of known frequency, the source signal being received by the sample, the sample emitting a sample signal based on the source signal, and a receiver configured to receive the sample signal including a plurality of spectral lines, the receiver including a first stage configured to receive a RF signal, the first stage configured to produce two first intermediate IF signals, a second stage configured to receive the two first IF signals, the second stage configured to produce two second IF signals, and a third stage configured to compute two resulting frequencies based on a sum and a difference between the two second IF signals, where the receiver combines the second IF signals to form a plurality of channels, and where the receiver detects the content of the sample based on the plurality of channels. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
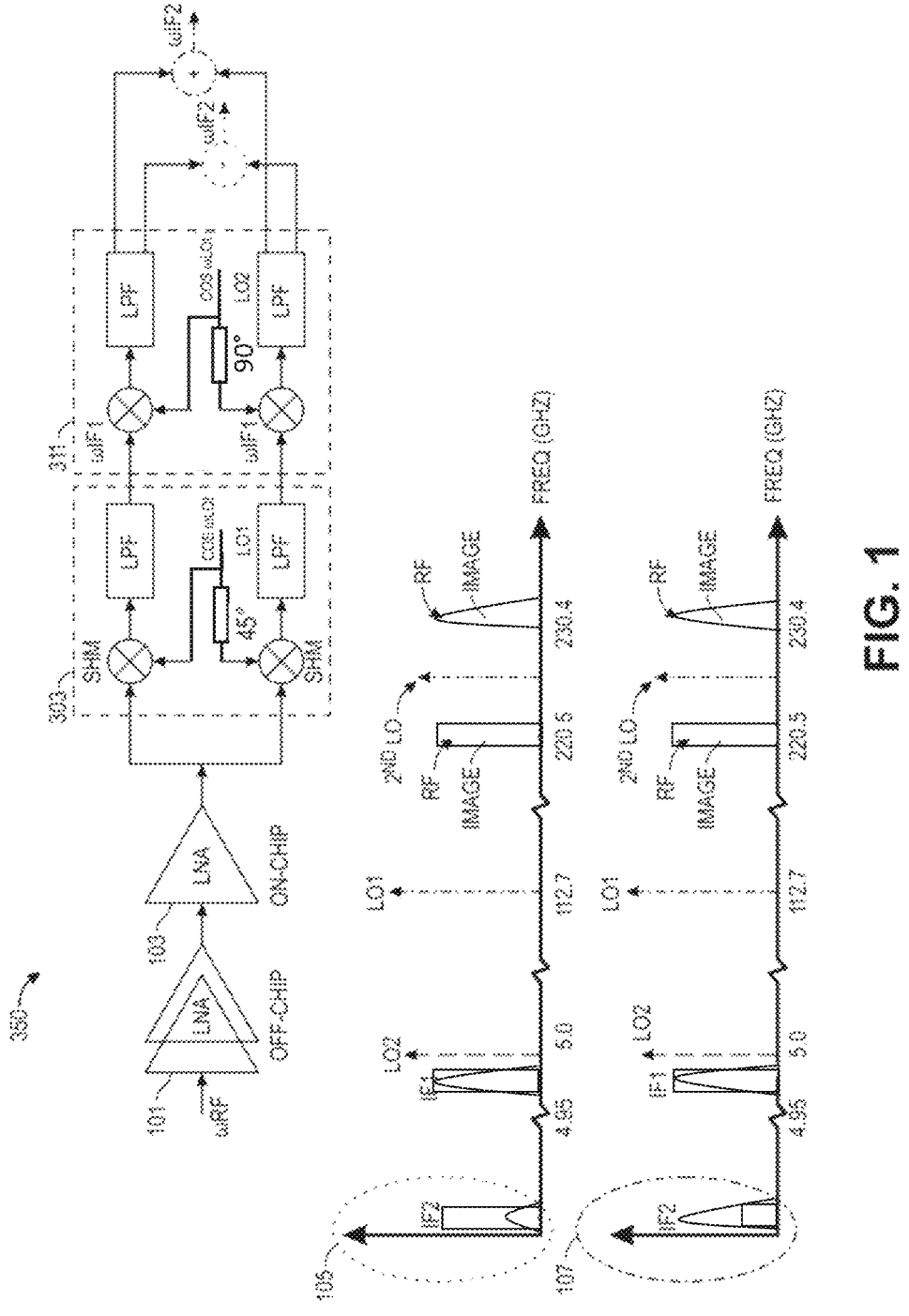
FIG. 1 is a circuit block diagram of an exemplary system including the circuit of the present teachings, and a spectral diagram indicating the spectra resulting from the exemplary circuit.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The circuit of the present teachings creates an ultra-compact, low power sub millimeter-wave (sub-mmW) spectroscopic receiver that uses microelectronics technology for lower cost, size, power and high flexibility space missions. The concept, however, is general regardless of the above application and can be used for any type of receiver. The circuit can be viewed as a modification to the Weaver architecture that can down convert and separate two input frequencies simultaneously to a very low IF that enables the features of a second stage described herein. The configuration of the present teachings can be implemented within a 1.5×1 mm2 package, compared to current systems that require 100 s of cm2.

Figure 2A:
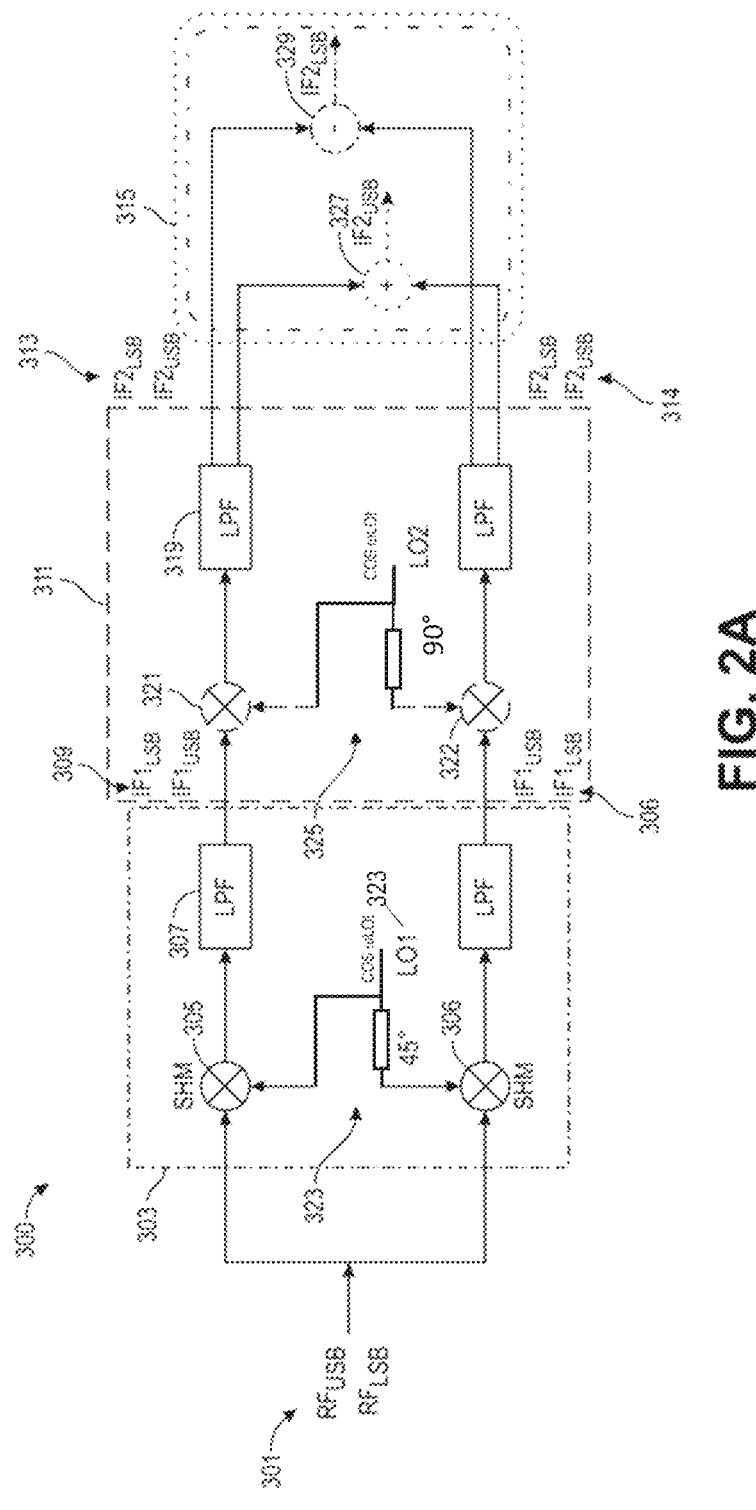
FIG. 2A is a circuit diagram of the circuit of the present teachings.

Referring now to FIGS. 1 and 2A, a system including the circuit of the present teachings is shown. In this exemplary configuration, two spectral lines at 220.5 GHz (lower side band (LSB)) and 230.4 GHz (upper side band (USB)), chosen for a type of element that is being detected, are received simultaneously. In the exemplary configuration, chip-scale proposed receiver architecture is shown that accommodates low IF, for example, but not limited to, less than 200 MHz, down conversion. The incoming signal in the exemplary system is fed through an off-chip InP LNA 101 (FIG. 1) and/or an on-chip LNA 103 (FIG. 1), for example. In the exemplary application shown in FIG. 1, an ASIC digital spectrometer (4096 channels) (not shown) could receive the output from the circuit of the present teachings.

Continuing to refer to FIGS. 1 and 2A, circuit 300 (FIG. 2A) of the present teachings is shown. Circuit 300 (FIG. 2A) takes three inputs in addition to DC bias of the different stages. Circuit 300 (FIG. 2A) takes an RF signal 301 (comprising two spectral lines at two different frequencies) (FIG. 2A), a signal from local oscillator 1 (LO1) 323 (FIG. 2A), and a signal from LO2 325 (FIG. 2A), and provides two output signals 327/329 (FIG. 2A). The circuit 300 (FIG. 2A) receives the RF signal 301 (FIG. 2A) from an antenna (not shown) or a sensor (not shown) (containing two spectral lines), and passes through the Low Noise Amplifiers (LNAs) 101/103 (FIG. 1) to amplify the RF signal 301 (FIG. 2A). With higher magnitude, the RF signal 301 (FIG. 2A) is split equally between the two mixers 305 (FIG. 2A) in the first stage 303 (FIG. 2A). The input is single-ended and the output is differential with intermediate frequency IF lower side band (LSB) and IF upper side band (USB).

Continuing to refer to FIGS. 1 and 2A, in an aspect, the architecture of the circuit 300 (FIG. 2A) of the system 350 (FIG. 1) is implemented in three stages. In an aspect, the first stage 303 (FIG. 1) includes, but is not limited to, passive mixers 305/306 (FIG. 2A) feeding lowpass filters (LPFs) 307 (FIG. 2A), and being fed by a local oscillator 1 (LO1) 323 (FIG. 2A). The LO1 323 (FIG. 2A) can be, for example, but not limited to, a 125 GHz multiplier provided by Virginia Diodes, Inc. In an aspect, the signal from the LO1 323 (FIG. 2A) is fed to the first mixer 305 (FIG. 2A) and simultaneously with the second mixer 306 (FIG. 2A) with a 45° shift.

If the mixers 305/306 (FIG. 2A) are not subharmonic, the signal from the LO1 323 (FIG. 2A) is fed to the second mixer 306 (FIG. 2A), for example, but not limited to, a passive mixer, with a 90° shift. In an aspect, when the mixers 305/306 (FIG. 2A) are subharmonic, with LO1 input, the resulting frequency is LO=(RF2−RF1)/2. In an aspect, subharmonic mixing can be replaced by regular mixing. Two spectral lines in the RF signal 301 (FIG. 1) are down converted to the same IF1 309 (FIG. 2A) frequency. In an aspect, the two spectral lines are separated depending on the LO selection. In an aspect, one spectral line is the image of the other.

Continuing to refer to FIGS. 1 and 2A, in an aspect, the second stage 311 (FIG. 1) is implemented by two double-balanced mixers 321/322 (FIG. 2A) receiving signals from LPFs 307 (FIG. 2A) and from the LO2 325 (FIG. 2A). The signal from the LO2 325 (FIG. 2A) is fed to the second mixer 322 (FIG. 2A) with a 90° shift because the mixer 321 (FIG. 2A) is not subharmonic. The double-balanced mixers 321/322 (FIG. 2A) are used to generate the signals in phase and out of phase in order to perform the separation. The LPF 307 (FIG. 2A) removes any frequencies above the IF1 309 (FIG. 2A), improving the down conversion of the second stage 311 (FIG. 1). Both signals at the input of the mixers 321/322 (FIG. 2A) are down converted to IF2 signals 313/314 (FIG. 2A), which are chosen based upon the application to which the circuit 300 (FIG. 2A) is applied. The frequency of the signal generated by the LO2 325 (FIG. 2A) is chosen to be near the IF1 309 (FIG. 2A) to produce relatively low IF2 signals 313/314 (FIG. 2A) such as, for example, −50 MHz. In general, the frequencies of the signals generated by LO1 323 (FIG. 2A) and LO2 325 (FIG. 2A) are chosen based upon the application and the targeted spectral lines. In an aspect, the LO2 325 (FIG. 2A) is a commercial product such as the 5 GHz signal generator provided by Keysight Technologies or can be designed on the same chip using a frequency synthesizer. In an aspect, the LO2 325 (FIG. 2A) can include a class AB power amplifier with enough power to drive the second stage 311 (FIG. 2A). In an aspect, the LO2 325 (FIG. 2A) is designed as described herein. Continuing to refer to FIGS. 1 and 2A, the third stage 315 (FIG. 2A) performs summing and subtracting of the resulting frequencies, producing the desired dual channel output.

Referring to FIG. 1, the spectral graphs 105/107 (FIG. 1) illustrate separation of the spectral lines resulting from traversing the circuit 300 (FIG. 2A). Specifically, the spectral graph 105 (FIG. 1) illustrates the RF1 spectral line being separated from the image RF2, and the spectral graph 107 (FIG. 1) illustrates the RF2 spectral line being separated from the image RF1. The spectral lines in the spectral graphs 105/107 (FIG. 1) show the association with the different stages.

Figure 2B:
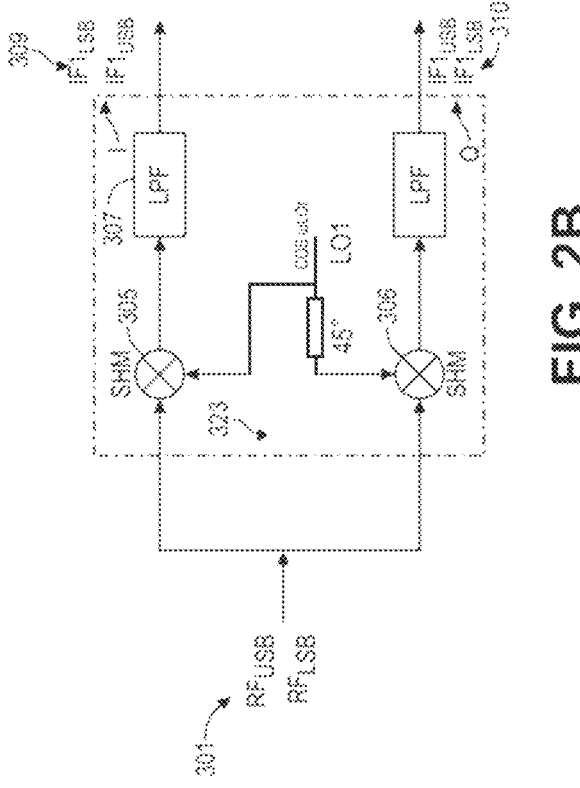
FIG. 2B is a circuit diagram of the first stage of the circuit of the present teachings.

Referring now to FIG. 2B, in the first stage, the two mixers 305/306 down convert the RF signal 301. In an exemplary configuration, the RF signal 301 at 220-230 GHz is down converted to 5 GHz with an LO1 323 that is 45° out of phase (quadrature down conversion I and Q). In this configuration, the mixers 305/306 are configured to terminate the first harmonic of the LO1 323 at 112 GHz and mix with the second harmonic of LO1 323 at 225 GHz. In an aspect, the mixers 305/306 are SiGe HBT based bipolar junction transistors (BJTs) or any similar active device with enough gain/power at any frequency. The IF signals 309/310 at 5 GHz out of the first stage of mixers 305/306 (containing four spectral lines, two per each side) goes through low pass filters 307 to the second stage 311 (FIG. 2A).

Figure 3:
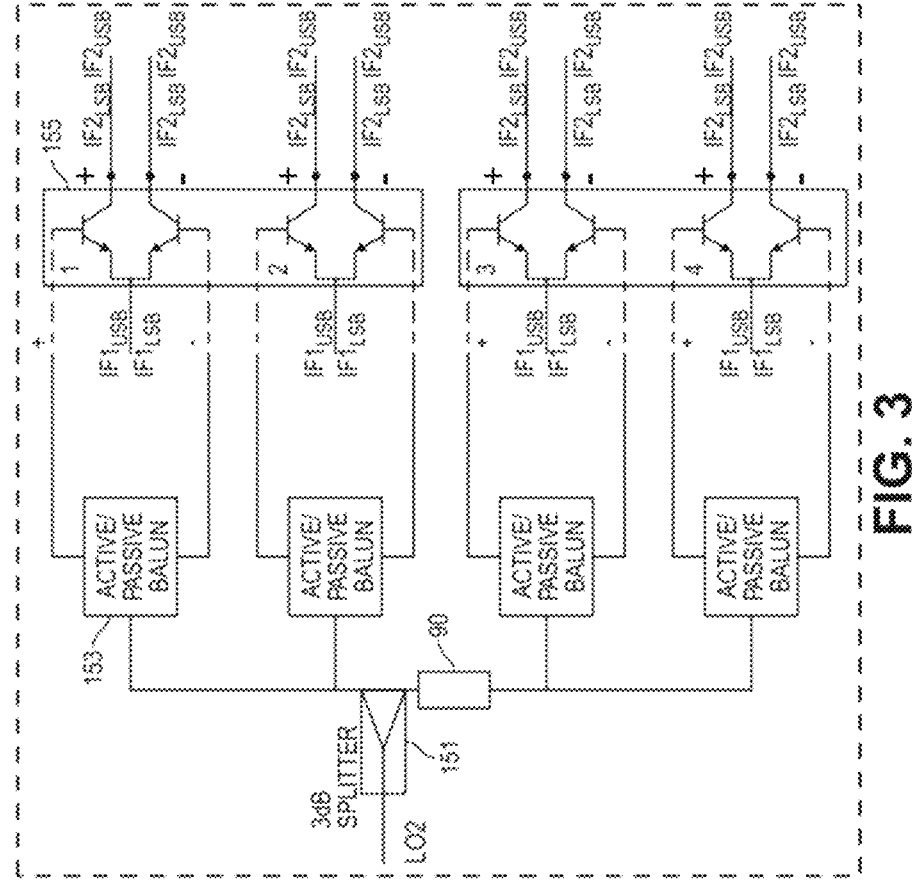
FIGS. 3-5B are circuit diagrams of a first option for the circuit of the second local oscillator of the present teachings.
Figure 4:
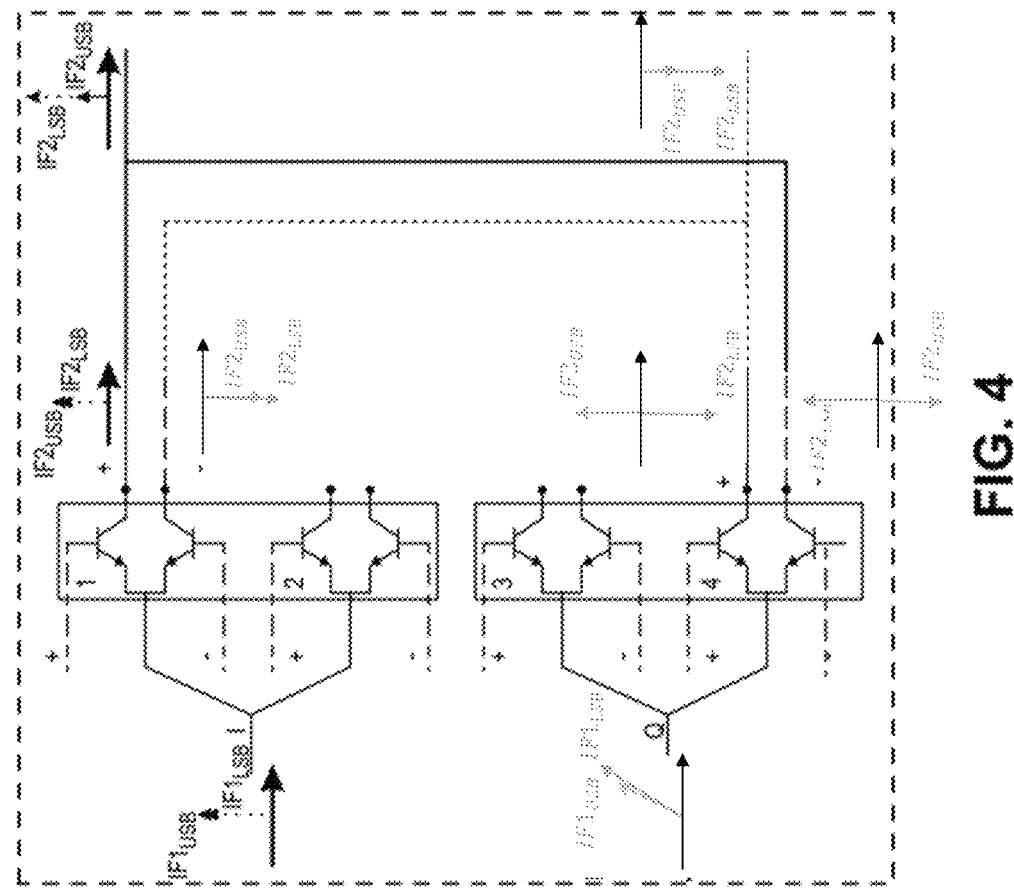

FIGS. 3-5B illustrate a first design option for the LO2 325 (FIG. 2A), and FIGS. 7-10 illustrate a second design option for the LO2 325 (FIG. 2A). Referring now to FIGS. 3-5B, in an aspect, a first option for an optimized version of the LO2 325 (FIG. 2A) is shown. A splitter 151 (FIG. 3), for example, a 3 dB splitter that splits the LO2 signal equally, splits the LO2 signal. The split signal is provided to the baluns 153 (FIG. 3), at least in part phase shifted. The baluns 153 (FIG. 3) can be on-chip or off-chip, active or passive. The baluns 153 (FIG. 3) provide the resulting signals to second stage mixers 155 (FIG. 3).

Figure 5A:
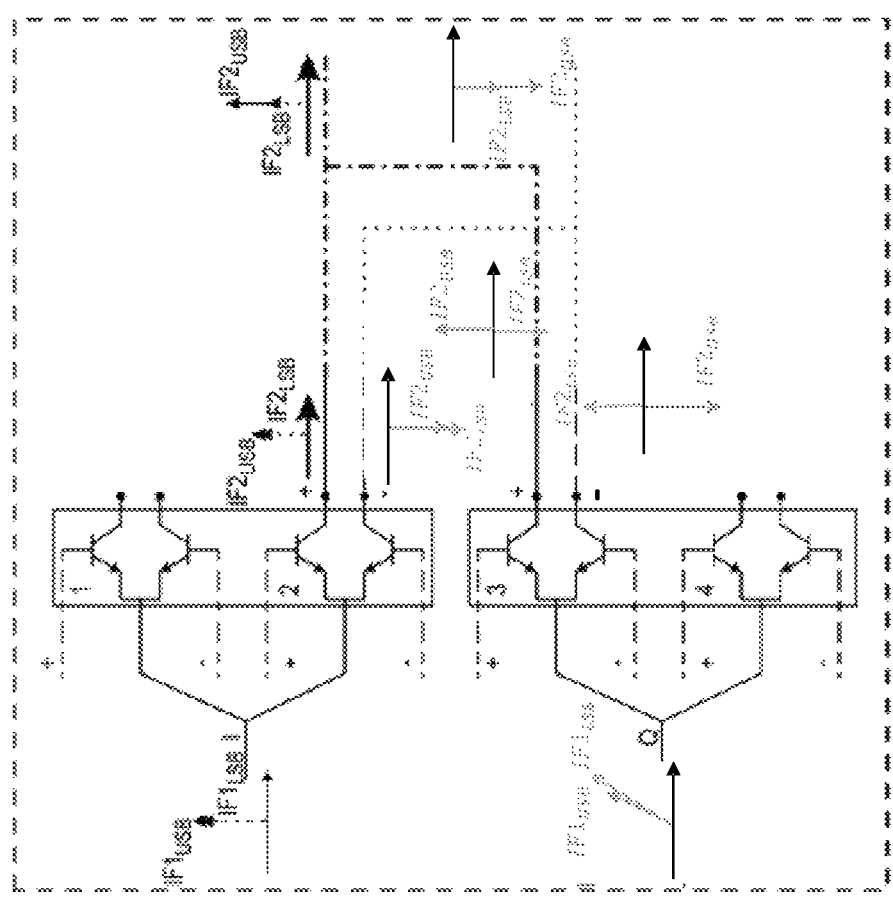
Figure 5B:
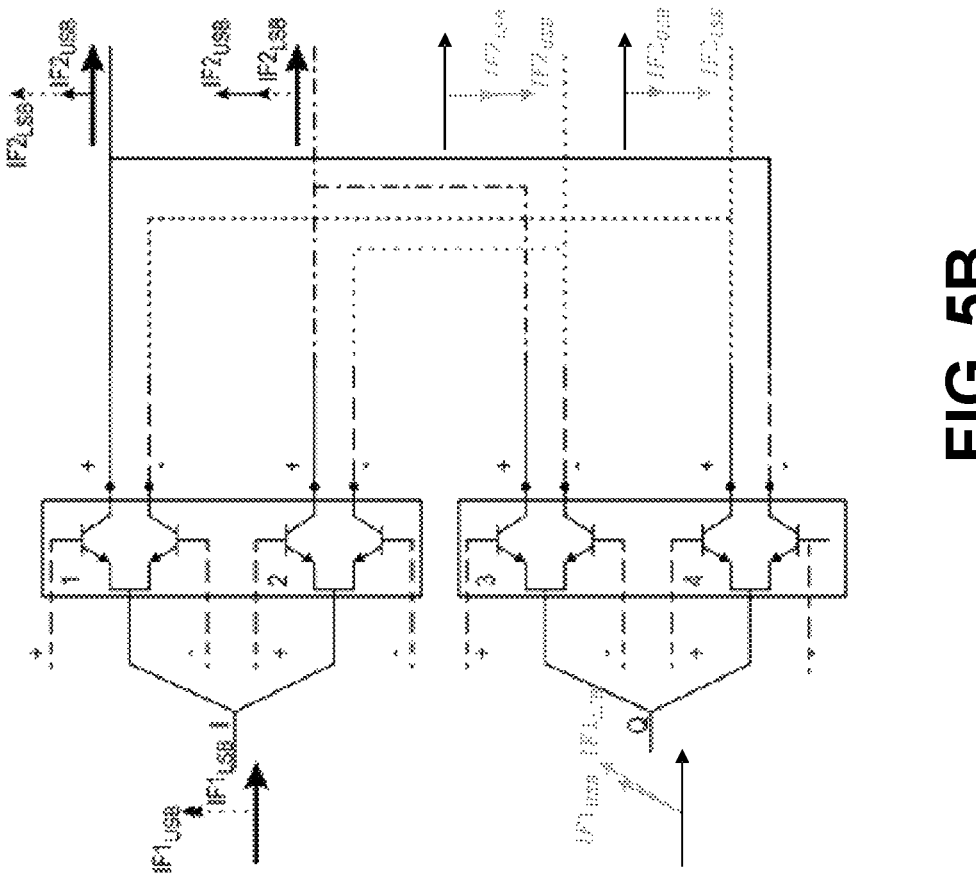
Figure 6A:
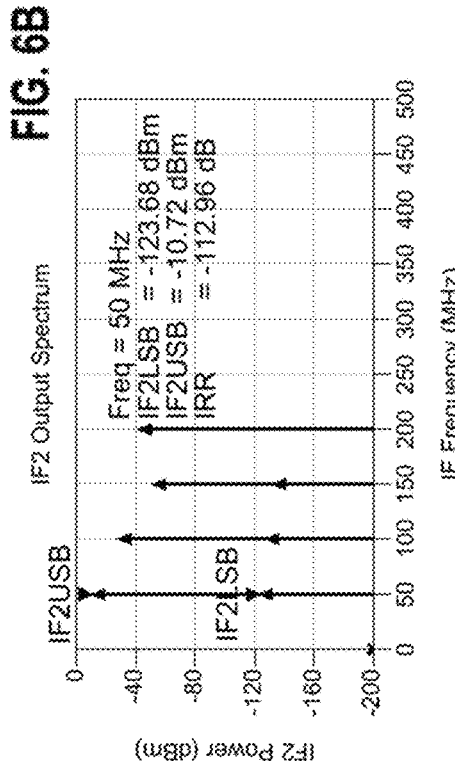
FIGS. 6A-6D are diagrams of the spectral graphs associated with the circuit diagram of FIG. 5B.
Figure 6B:
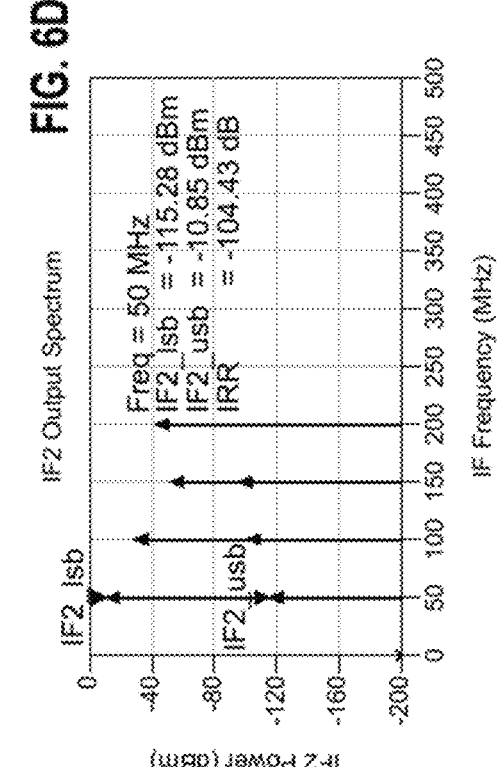
Figure 6C:
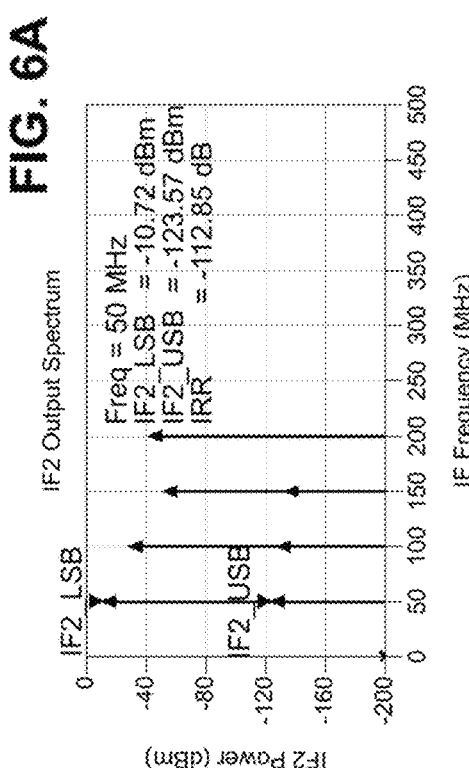
Figure 6D:
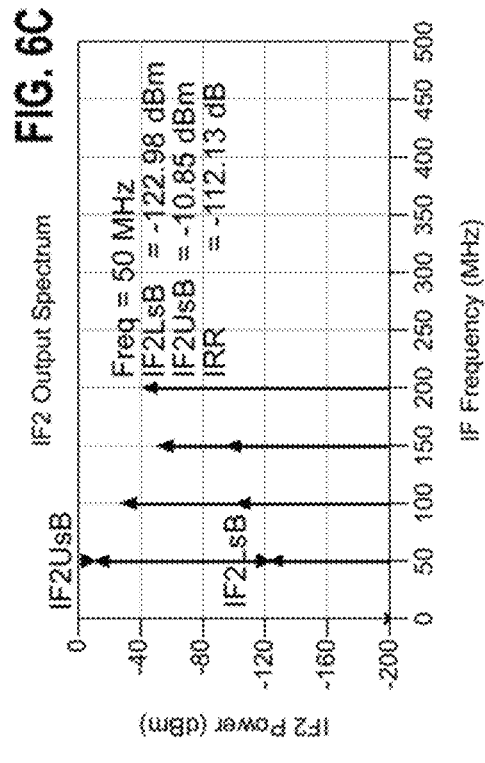
Figure 7:
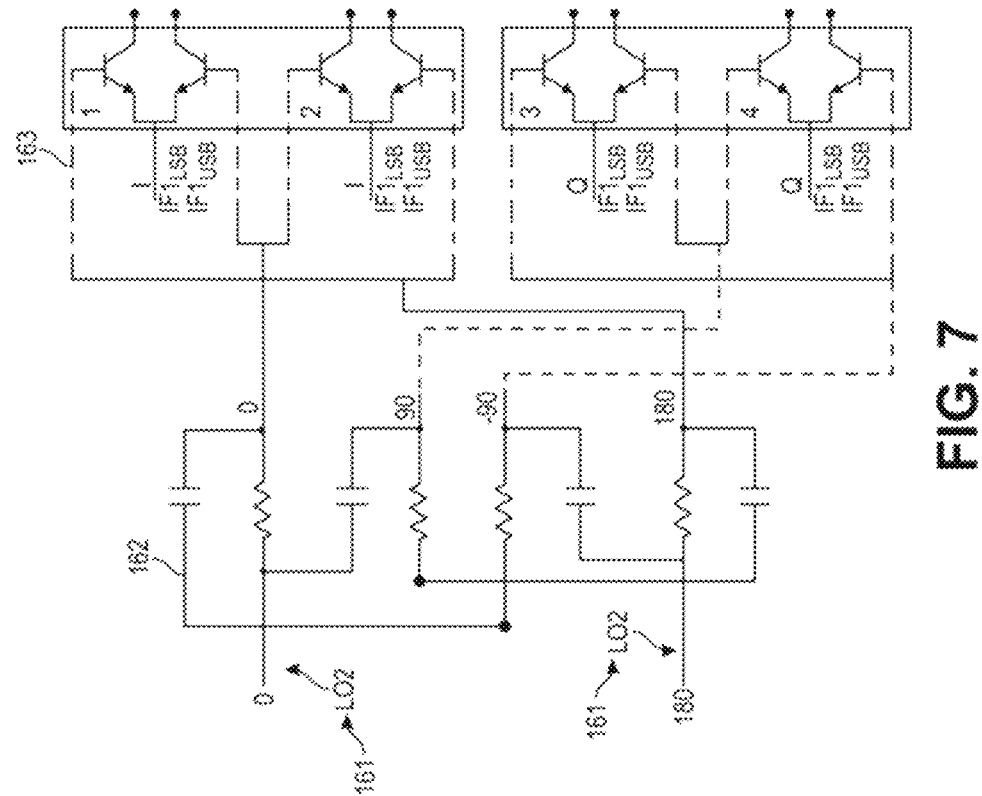
FIGS. 7-10 are circuit diagrams of a second option for the circuit of the second local oscillator of the present teachings.

Referring now to FIG. 5A, set #1 of the second stage mixers produces IF2 for both spectral lines (USB and LSB) in phase while set #4 produces IF2 for both spectral lines (USB and LSB) out of phase. IF2 of the upper sideband from set #1 (positive side) combines with IF2 upper sideband from set #4 (negative side) cancelling each other since they are out of phase. IF2 of the lower side band from set #1 (positive side) combines with IF2 lower side band from set #4 (negative side) adding up since they are in phase. The second combination of IF2 of the upper sideband from set #1 (negative side) combines with IF2 upper sideband from set #4 (positive side) cancelling each other since they are out of phase. IF2 of the lower side band from set #1 (negative side) combines with IF2 lower side band from set #4 (positive side) adding up since they are in phase. The resulting signals form the differential channel for the lower side band signal while suppressing (rejecting) the image represented as the upper side band signal.

Referring now to FIG. 5, set #2 of the second stage mixers produces IF2 for both spectral lines (USB and LSB) in phase while set #3 produces IF2 for both spectral lines (USB and LSB) out of phase. IF2 of the upper sideband from set #2 (positive side) combines with IF2 upper sideband from set #3 (positive side) adding up since they are in phase. IF2 of the lower side band from set #2 (positive side) combines with IF2 lower side band from set #3 (positive side) cancelling each other since they are out of phase. The second combination of IF2 of the upper sideband from set #2 (negative side) combines with IF2 upper sideband from set #3 (negative side) adding up since they are in phase. IF2 of the lower side band from set #2 (negative side) combines with IF2 lower side band from set #4 (negative side) cancelling each other since they are out of phase. The resulting signals form the differential channel for the upper side band signal while suppressing (rejecting) the image represented as the lower side band signal.

Specifically, as long as the differential realization of the LO network is achieved, the other components of the circuit become design choices based on the desired balance of features. For example, choosing to enlarge the bandwidth could impact the complexity of the circuit. In an aspect, mixers can be active or passive, with active mixers producing a higher gain than passive mixers. In an aspect, a gain stage can be added to amplify IF1 before it is fed to the second stage. In an aspect, the number of baluns can be reduced based on signal splitting. For example, a single balun can be used for sets #1 and #2, and another for sets #3 and #4.

Referring now to FIGS. 5B and 6A-6D, the results of a simulation of the first LO2 option are shown. Two spectral lines are plotted to show the separation with the IRR (ideal performance). Each spectral graph pertains to a situation in which sets #1 to #4 produce an expected phase and amplitude to achieve the separation of the sidebands.

Referring now to FIGS. 7-10, a second option for the implementation of the LO2 325 (FIG. 2A) is shown. In an aspect, the second stage 311 (FIG. 2A) is implemented with a phasing structure, for example, but not limited to, a differential polyphase filter 162 (FIG. 7), to provide the phasing required to down convert to the final IF and to achieve the sideband separation. The polyphase filter 162 (FIG. 7) takes a differential of the signal from the LO2 325 (FIG. 2A) at 5 GHz, for example, and provides the mixers 163 (FIG. 7) with four different phases 0, 90, −90, and 180. The output of the second stage 311 (FIG. 2A) is eight paths that are combined to produce two differential outputs achieving sideband separation. There are four sets of mixers 163 (FIG. 7) for a total of eight mixers. A differential output requires two signal paths per output. Thus four devices combine to produce one differential output.

Figure 8:
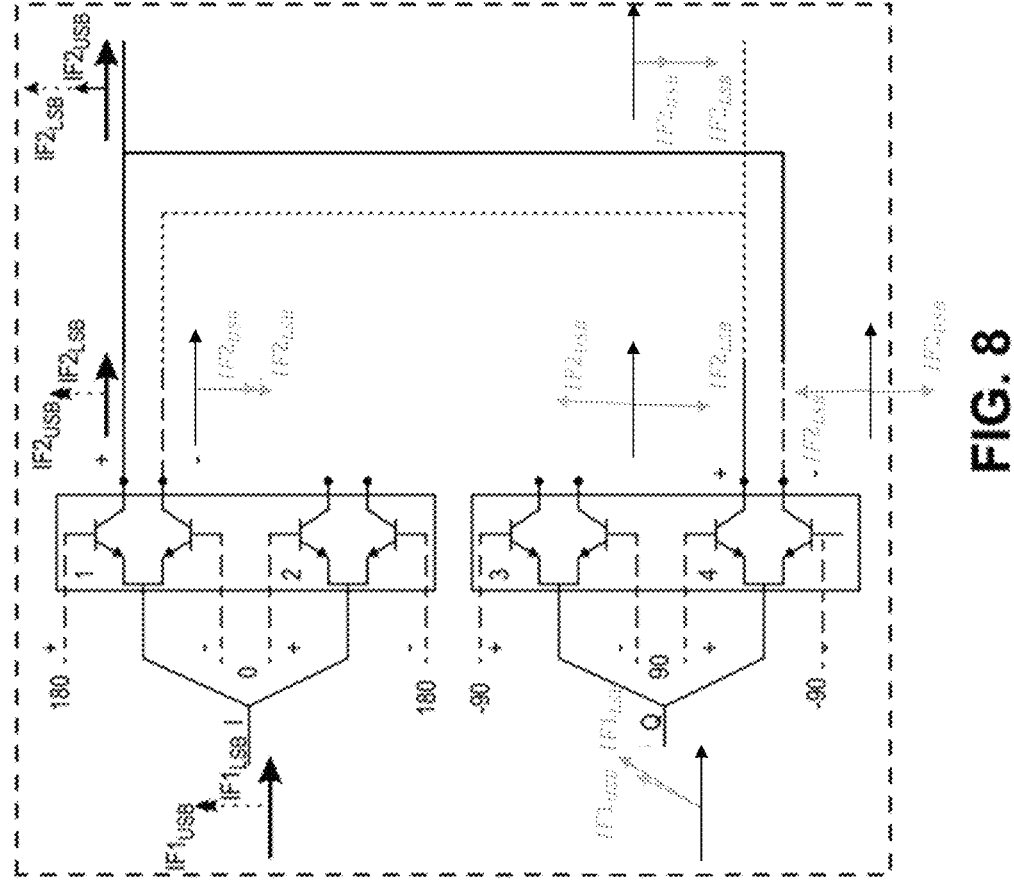

Referring now to FIG. 8, set #1 of the second stage mixers produces IF2 for both spectral lines (USB and LSB) in phase while set #4 produces IF2 for both spectral lines (USB and LSB) out of phase. IF2 of the upper sideband from set #1 (positive side) combines with IF2 upper sideband from set #4 (negative side) cancelling each other since they are out of phase. IF2 of the lower side band from set #1 (positive side) combines with IF2 lower side band from set #4 (negative side) adding up since they are in phase. The second combination of IF2 of the upper sideband from set #1 (negative side) combines with IF2 upper sideband from set #4 (positive side) cancelling each other since they are out of phase. IF2 of the lower side band from set #1 (negative side) combines with IF2 lower side band from set #4 (positive side) adding up since they are in phase. The resulting signals form the differential channel for the lower side band signal while suppressing (rejecting) the image represented as the upper side band signal.

Figure 9:
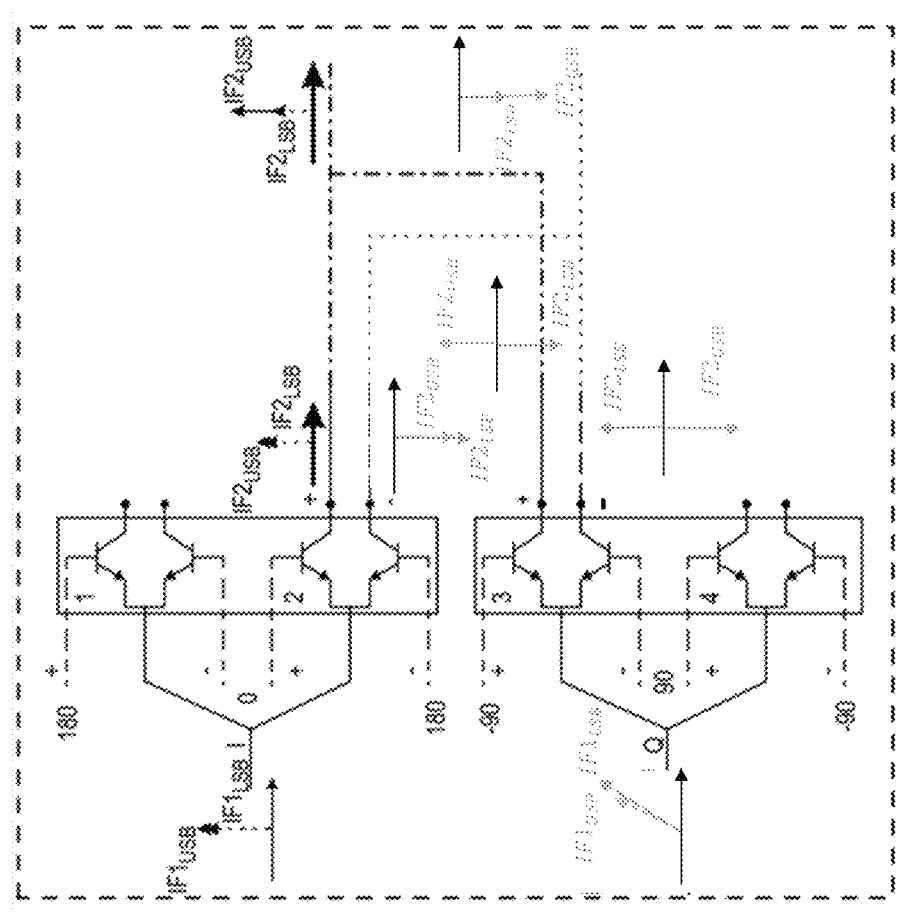

Referring now to FIG. 9, set #2 of the second stage mixers produces IF2 for both spectral lines (USB and LSB) in phase while set #3 produces IF2 for both spectral lines (USB and LSB) out of phase. IF2 of the upper sideband from set #2 (positive side) combines with IF2 upper sideband from set #3 (positive side) adding up since they are in phase. IF2 of the lower side band from set #2 (positive side) combines with IF2 lower side band from set #3 (positive side) cancelling each other since they are out of phase. The second combination of IF2 of the upper sideband from set #2 (negative side) combines with IF2 upper sideband from set #3 (negative side) adding up since they are in phase. IF2 of the lower side band from set #2 (negative side) combines with IF2 lower side band from set #4 (negative side) cancelling each other since they are out of phase. The resulting signals form the differential channel for the upper side band signal while suppressing (rejecting) the image represented as the lower side band signal. As with the first option, as long as the differential realization of the LO network is achieved, the other components of the circuit become design choices based on the desired balance of features. In an aspect, the first and second stage are DC coupled. As with the first option, the mixers can be active or passive.

Figure 10A:
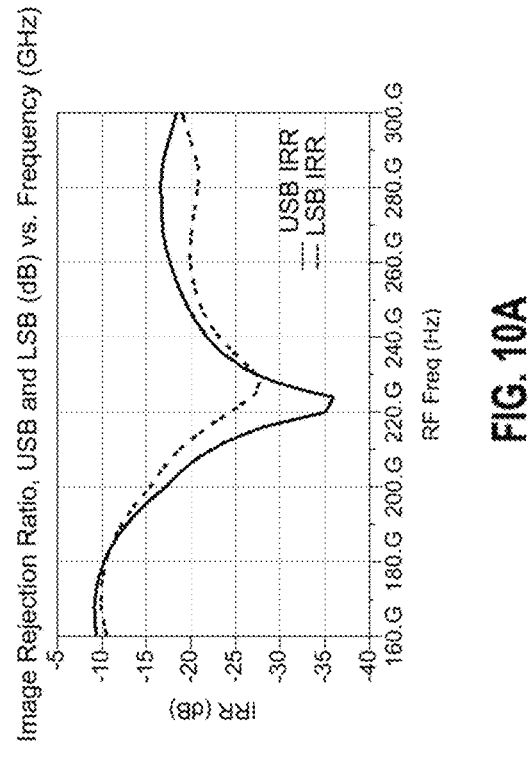
FIG. 10A is a graph of a simulated IRR of upper side band and lower side band channels associated with the circuit diagram of FIG. 10.
Figure 10:
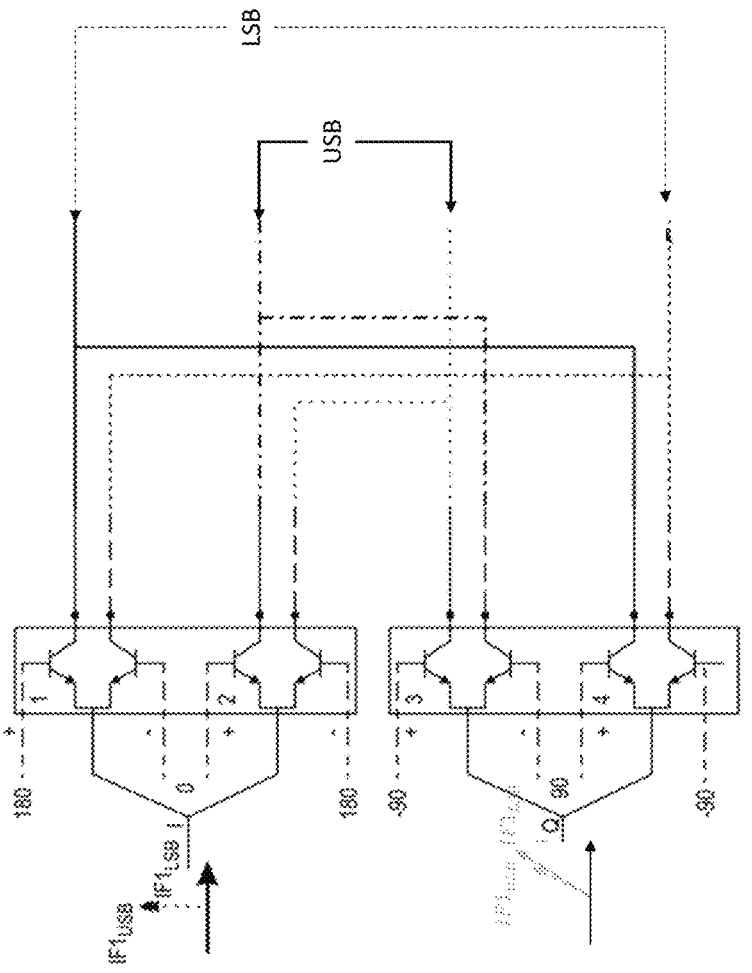

Referring now to FIGS. 10 and 10A, the performance of a simulation of the second LO2 option is shown. The IRR of both channels is plotted versus the RF signal applied at the input in FIG. 10A.

Figure 11:
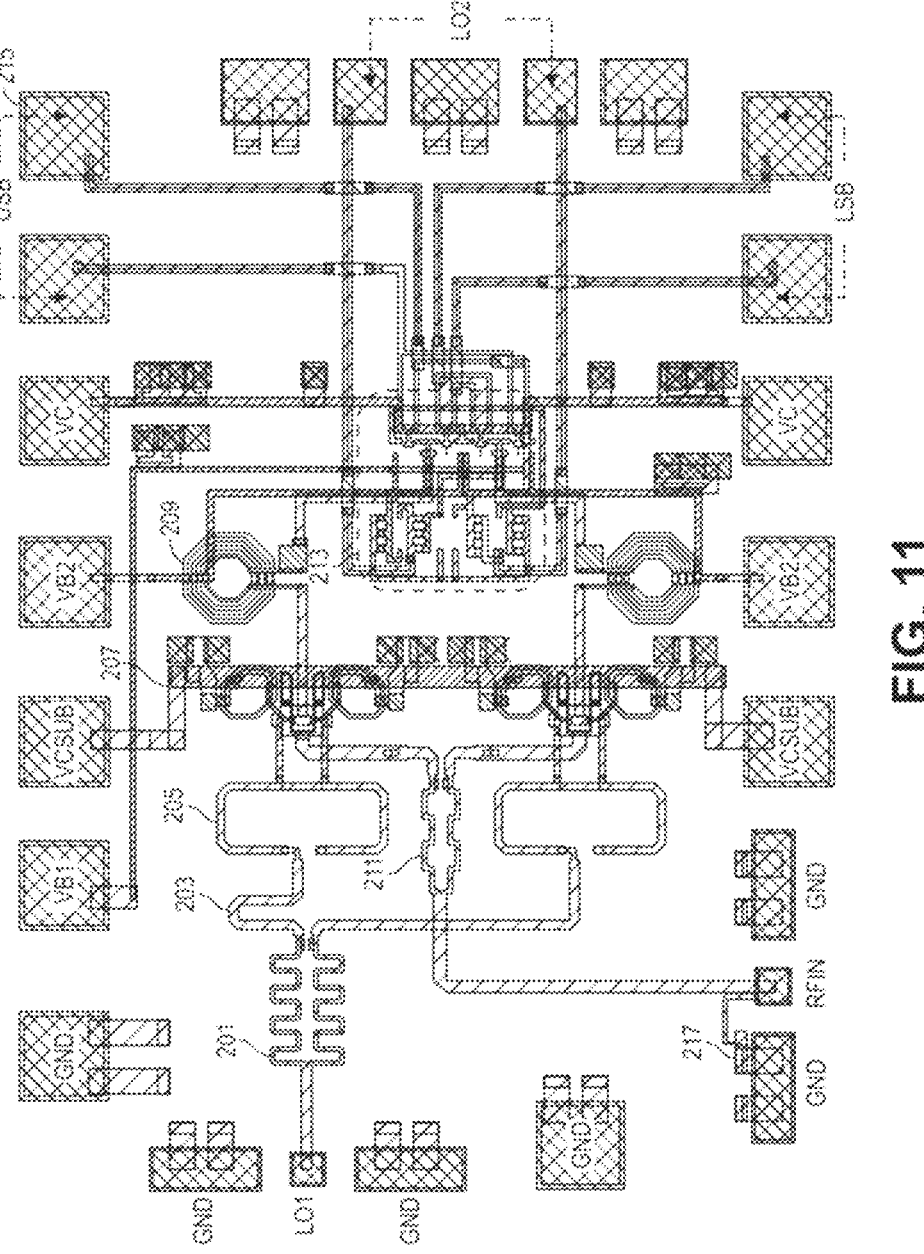
FIG. 11 is a detailed circuit layout of the present teachings.

Referring now to FIG. 11, an implementation of the circuit of the present teachings is shown. Included in the circuit is a pad cap resonator 217 associated with the RF input. The RF signal passes to an RF Wilkinson splitter 211, a differential balun 205, and an LO1 Wilkinson splitter 201. Signals traveling through Wilkinson splitters 211 split into two equal phase output signals. The signal travels from the LO1 Wilkinson splitter 201 to a delay line (phase shift) 203, and then to a second differential balun 205. The signal traveling through the RF Wilkinson splitter 211 travels through two subharmonic mixers with DC feed 207, along with the signals traveling through the differential baluns 205, and then on to low pass matching with DC block capacitor 209 components. The signals enter the second stage mixers, passing through polyphase filter 213, and then to differential outputs (USB and LSB) 215.

Figure 12A:
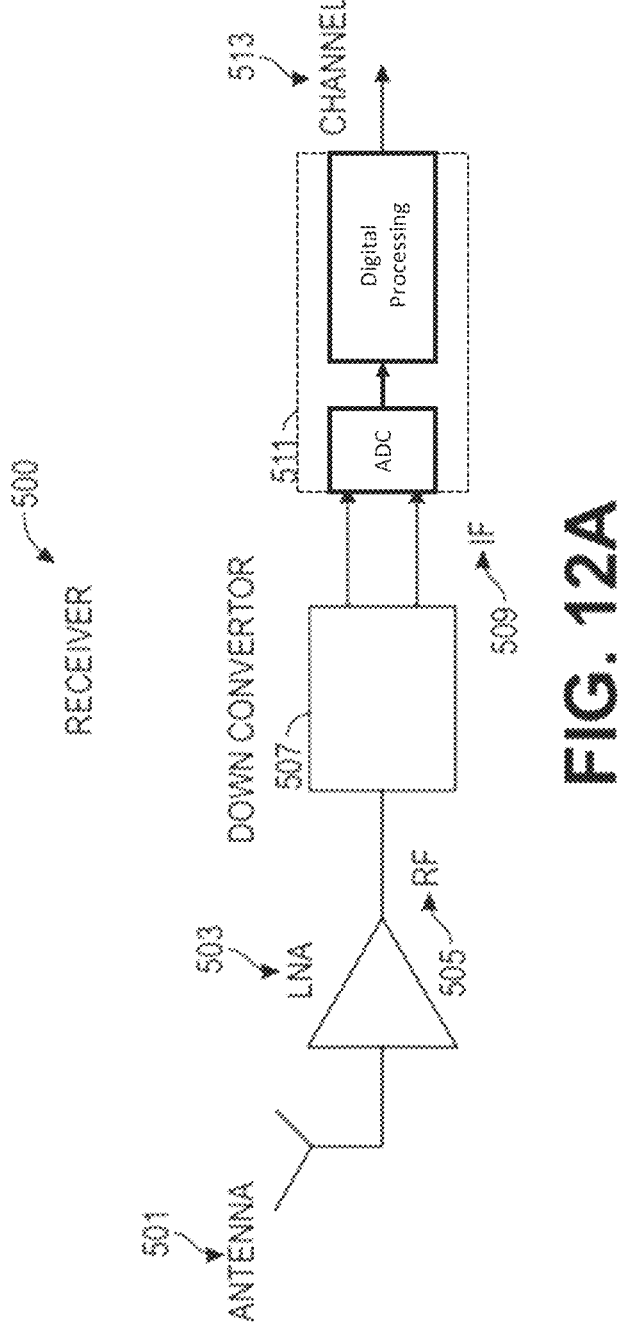
FIGS. 12A and 12B are circuit diagrams of the circuit of receiver and transceiver circuits employing the circuit of the present teachings.
Figure 12B:
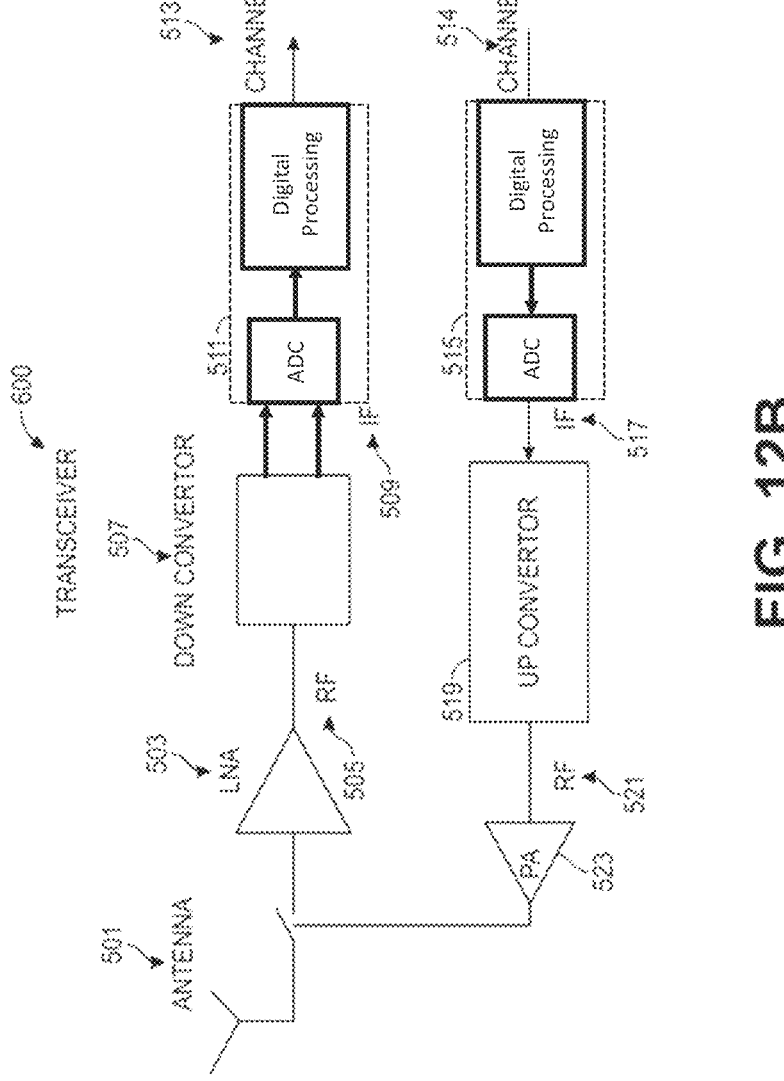

Referring now to FIGS. 12A and 12B, the circuit of the present teachings can be used as part of any receiver 500 (FIG. 12A) or transceiver 600 (FIG. 12B). In an aspect, generic receiver 500 (FIG. 12A) includes an antenna 501 that provides a signal to the low noise amplifier 503, which provides the amplified RF signal 505 to the circuit 507 of the present teachings. The circuit 507 provides two channels of intermediate frequency 509 to a receiving digital processing subsystem 511, which produces a single channel of data 513. In an aspect, generic transceiver 600 includes the elements of receiver 500 in addition to signal transmitter elements. On the transmitter side, a single channel of data 514 (FIG. 12B) is provided to a transmitting digital processing subsystem 515 (FIG. 12B) that produces an intermediate frequency signal 517 (FIG. 12B) to be transmitted. The intermediate frequency signal 517 (FIG. 12B) is provided to an up converter 519 (FIG. 12B) that produces an RF signal 521 (FIG. 12B). The RF signal 521 (FIG. 12B) is provided to a power amplifier 523 (FIG. 12B) to be transmitted through the antenna 501 (FIG. 12B).

Figure 13B:
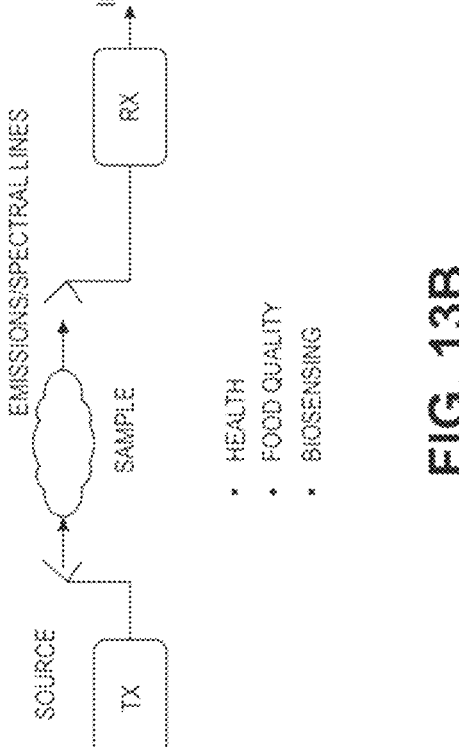
FIGS. 13A and 13B are pictorial diagrams of applications of the circuit of the present teachings.
Figure 13A:
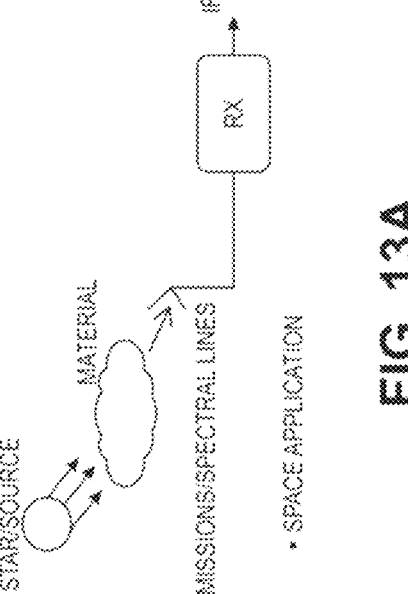

Referring now to FIGS. 13A-13B, shown are exemplary configurations including the circuit of the present teachings. In FIG. 13A, the frequency of the source is unknown and uncontrolled, whereas in FIG. 13B, the frequency of the source is known and controlled. In both cases, the source signal is received by a material or sample which itself emits a signal. The material or sample signal is received by the circuit of the present teachings, which produces an IF, as described herein. The IF provides information about the characteristics of the material or sample. The source in FIG. 13A is, for example, a star or other light source, the material is, for example, a celestial body, and the IF provides information about the chemical makeup of the celestial body. The source in FIG. 13B is a transmitter emitting a known frequency signal. A sample having some known characteristics receives the source signal and itself emits a signal. The sample signal is received by the circuit of the present teachings which produces an IF. The IF provides information about the chemical makeup of the sample. The sample can include, for example, human tissue or food.

Those skilled in the art will recognize improvements and modifications to the preferred embodiments of the present disclosure. All such improvements and modifications are considered within the scope of the concepts disclosed herein.

What is claimed is:

1. A method for sideband separation in signal receivers comprising:
   receiving a plurality of radio frequency (RF) signals including a plurality of spectral lines;
   mixing and downconverting the plurality of RF signals to first intermediate frequency (IF) signals;
   separating the first IF signals into a plurality of channels, the plurality of channels including two spectral lines and an image rejection ratio produced by pre-selected phase combinations;
   mixing and downconverting the first IF signals into second IF signals, wherein a first signal of the second IF signals accumulates a same phase after the downconversion and a second signal of the second IF signals creates out-of-phase signals at upper and lower channels of the first signal;
   preserving the first signal and eliminating the second signal by summing the upper and lower channels;
   preserving the second signal located at the image frequency of the first signal and eliminating the first signal by differencing the upper and lower channels;
   separating the first signal from the second signal by manipulating a phase and amplitude of the two spectral lines, wherein the separating enables observing the first signal without the second signal; and
   detecting chemical spectral information from the first signal.

2. The method as in claim 1 wherein the first IF signals comprise:
   a down converted RF signal 1 and signal 2 formed by mixing the RF signal with a first local oscillator signal; and
   a phase-shifted local oscillator signal,
   wherein the RF signal 1 and signal 2 are the two spectral lines that are located at the image frequencies of each other similar to upper sideband and lower sideband of modulated signal across a carrier.

3. The method as in claim 1 further comprising:
   low pass filtering the first IF signals.

4. The method as in claim 1 wherein the second IF signals are formed by mixing the first IF signals with a second local oscillator signal; and
   a second phase-shifted second local oscillator signal.

5. The method as in claim 4 wherein the second local oscillator signal comprises:
   a splitter configured to split first local oscillator signals; and
   at least one balun configured to receive the split signals, the at least one balun configured to receive phase-shifted of the split signals,
   wherein four output phased quadrature local oscillator signals are generated.

6. The method as in claim 4 wherein the second local oscillator signal comprises:
   a polyphase filter configured to take a differential of a signal, the polyphase filter providing four output phased signals use for quadrature local oscillator.

7. The method as in claim 1 further comprising:
   low pass filtering the second IF signals.

8. The method as in claim 1 wherein combining the second IF signals comprises:
   summing two of the second IF signals forming a first output channel;
   differencing two of the second IF signals forming a second output channel; and
   providing the first output channel and the second output channel to a channel receiver.

9. The method as in claim 8 wherein the channel receiver enables detecting molecular content and isotopic abundance from a spectral observation embodied in the first output channel and the second output channel.

10. A circuit for sideband separation in signal receivers comprising:
   a first stage configured to receive a radio frequency (RF) signal, the first stage configured to produce two first intermediate frequency (IF) signals, wherein the two first IF signals are separated into a plurality of channels, the plurality of channels including two spectral lines and an image rejection ratio produced by pre-selected phase combinations;

a second stage configured to receive the two first IF signals, the second stage configured to produce two second IF signals, wherein a first signal of the two second IF signals accumulates a same phase after the downconversion and a second signal of the two second IF signals creates out-of-phase signals at upper and lower channels of the first signal; and a third stage configured to compute two resulting frequencies based on a sum and a difference between the two second IF signals, wherein the sum preserves the first of the resulting frequencies and eliminates a second of the resulting frequencies, the second of the resulting frequencies being located at the image frequency of the first of the resulting frequencies, the difference eliminates the first of the resulting frequencies, wherein the first of the resulting frequencies is separated from the second of the resulting frequencies by manipulating a phase and amplitude of the two spectral lines, wherein the separating enables observing the first of the resulting frequencies, wherein chemical spectral information is detected from the first of the resulting frequencies.

11. The circuit as in claim 10 wherein the first stage comprises:

a first local oscillator (LO1) producing an LO1 signal;

a first stage first mixer configured to mix a first phase of the LO1 signal with the RF signal forming a first mixed signal;

a first stage second mixer configured to mix a second phase of the LO1 signal with the RF signal forming a second mixed signal;

a first stage first low pass filter (LPF); and a first stage second LPF.

12. The circuit as in claim 11 wherein the second stage comprises:

a second local oscillator (LO2) producing an LO2 signal;

a second stage first mixer configured to mix a first phase of the LO2 signal with the two first IF signals forming a second stage first mixed signal;

a second stage second mixer configured to mix a second phase of the LO2 signal with the two first IF signals forming a second stage second mixed signal;

a second stage first LPF; and a second stage second LPF.

13. The circuit as in claim 12 wherein the LO2 comprises:

a splitter configured to split the LO2 signal; and a plurality of baluns together with 90 degrees phase shifter configured to receive the split signals, the plurality of baluns configured to provide the split signals and their quadrature to the second stage first mixer and the second stage second mixer.

14. The circuit as in claim 12 wherein the LO2 comprises:

a polyphase filter configured to provide a quadrature phasing required to down convert to a second stage second IF signal frequency.

15. A method for detecting content of a sample based on emitted spectral lines, the method comprising:

transmitting a source signal of known frequency, the source signal being received by the sample, the sample emitting a sample signal based on the source signal;

receiving the sample signal including a plurality of spectral lines;

mixing and downconverting the sample signal to first intermediate frequency (IF) signals;

separating the first IF signals into a plurality of channels, the plurality of channels including two spectral lines and an image rejection ratio produced by pre-selected phase combinations;

mixing and downconverting the first IF signals into second IF signals, wherein a first signal of the second IF signals accumulates a same phase after the downconversion and a second signal of the second IF signals creates out-of-phase signals at upper and lower channels of the first signal;

preserving the first signal and eliminating the second signal by summing the upper and lower channels;

preserving the second signal located at the image frequency of the first signal and eliminating the first signal by differencing the upper and lower channels;

separating the first signal from the second signal by manipulating a phase and amplitude of the two spectral lines, wherein the separating enables observing the first signal without the second signal; and detecting the content of the sample based on the first signal plurality of channels.

16. The method as in claim 15 wherein combining the second IF signals comprises:

summing two of the second IF signals forming a first output channel;

differencing two of the second IF signals forming a second output channel; and providing the first output channel and the second output channel to a channel receiver.

17. The method as in claim 15 wherein the content comprises:

molecular content and isotopic abundance.

18. The method as in claim 15 wherein the second IF signals comprise:

formed by mixing the first IF with a local oscillator signal, the local oscillator signal including a splitter configured to split the local oscillator signals, 90 degree phase shifter, and at least one balun configured to receive the split signals, the at least one balun configured to receive phase-shifted of the split signals.

19. The method as in claim 18 wherein the local oscillator signal comprises:

a polyphase filter configured to take a differential of a signal, the polyphase filter providing four output phased signals.

20. A system for detecting content of a sample based on emitted spectral lines, the system comprising:

a transmitter configured to transmit a source signal of known frequency, the source signal being received by the sample, the sample emitting a sample signal based on the source signal;

a receiver configured to receive the sample signal including a plurality of spectral lines, the receiver including:

a first stage configured to receive a radio frequency (RF) signal, the first stage configured to produce two first intermediate frequency (IF) signals, wherein the two first IF signals are separated into a plurality of channels, the plurality of channels including two spectral lines and an image rejection ratio produced by pre-selected phase combinations;

a second stage configured to receive the two first IF signals, the second stage configured to produce two second IF signals, wherein a first signal of the two second IF signals accumulates a same phase after the downconversion and a second signal of the two second IF signals creates out-of-phase signals at upper and lower channels of the first signal; and a third stage configured to compute two resulting frequencies based on a sum and a difference between the two second IF signals, wherein the sum preserves the first of the resulting frequencies and eliminates a second of the resulting frequencies, the second of the resulting frequencies being located at the image frequency of the first of the resulting frequencies, the difference eliminates the first of the resulting frequencies, wherein the first of the resulting frequencies is separated from the second of the resulting frequencies by manipulating a phase and amplitude of the two spectral lines, wherein the separating enables observing the first of the resulting frequencies, wherein chemical spectral information is detected from the first of the resulting frequencies, wherein the receiver detects the content of the sample based on the first signal.

* * * * *